United States Patent [19]

Watanabe et al.

[11] Patent Number: 4,789,049

[45] Date of Patent: Dec. 6, 1988

[54] SIGNAL TRANSMITTING EQUIPMENT FOR ELEVATOR

[75] Inventors: Eiki Watanabe; Takesi Sakurada, both of Inazawa, Japan

[73] Assignee: Mitsubishi Denki Kabushiki Kaisha, Japan

[21] Appl. No.: 173,552

[22] Filed: Mar. 25, 1988

[30] Foreign Application Priority Data

Apr. 2, 1987 [JP] Japan .................................. 62-81711

[51] Int. Cl.⁴ .............................................. B66B 3/00
[52] U.S. Cl. ...................................... 187/130; 191/10
[58] Field of Search ................... 187/130, 139; 191/10

[56] References Cited

U.S. PATENT DOCUMENTS

| | | | |
|---|---|---|---|
| 2,505,144 | 4/1950 | Rutherford | 187/130 |
| 3,203,506 | 8/1965 | Cummins | 187/130 X |
| 3,662,861 | 5/1972 | White et al. | 187/130 |
| 4,203,010 | 5/1980 | Brooks | 191/10 X |
| 4,331,959 | 5/1982 | Brauer et al. | 191/10 X |

FOREIGN PATENT DOCUMENTS 51-17788  6/1976  Japan .
58-127066  8/1983  Japan .

Primary Examiner—William M. Shoop, Jr.
Assistant Examiner—W. E. Duncanson, Jr.
Attorney, Agent, or Firm—Leydig, Voit & Mayer

[57] ABSTRACT

This invention relates to an elevator signal transmitting equipment characterized in that a shielding body of a magnetic shielding material envelops a transmitting line laid along a shaft through which a cage travels and a portion of a coupling device extending toward said transmitting line, the transmission and reception of signals being realized through the magnetic coupling between said transmitting line and said coupling device to control the operation of said cage, a path through which a part of said coupling device travels being left not enveloped.

14 Claims, 3 Drawing Sheets

FIG. I
PRIOR ART
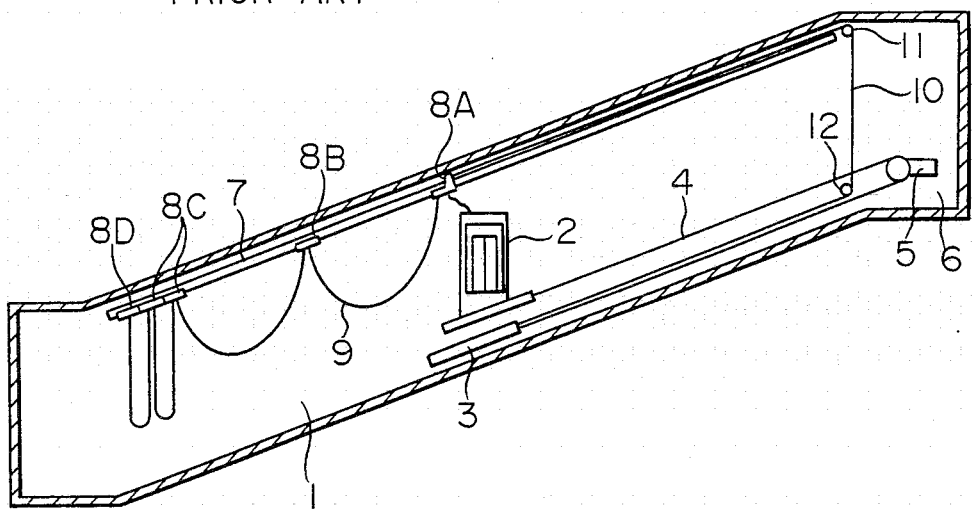
FIG. 2
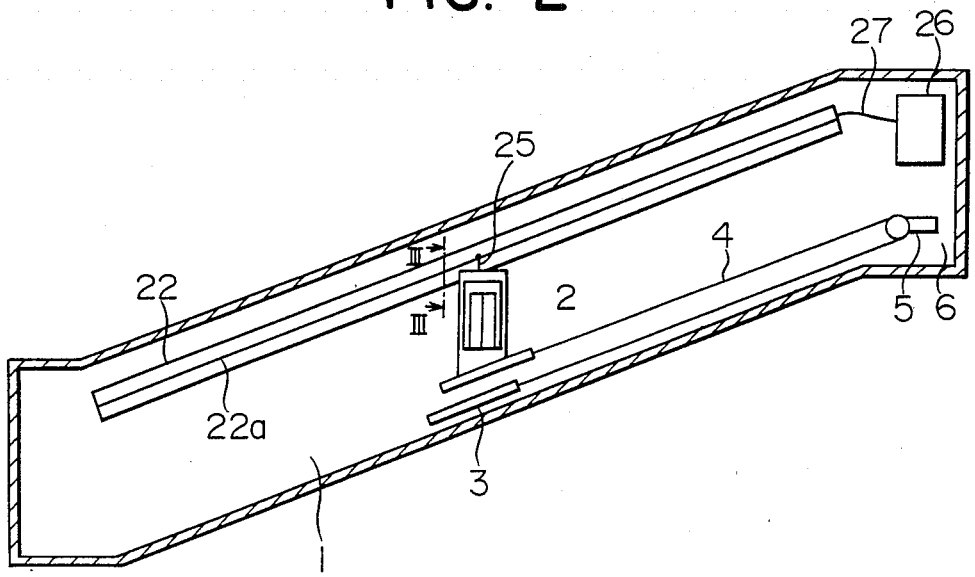

SIGNAL TRANSMITTING EQUIPMENT FOR ELEVATOR

BACKGROUND OF THE INVENTION

The present invention relates to a signal transmitting equipment between an elevator cage and a shaft through which said cage travels.

FIG. 1 is a lengthwise sectional view of an inclined shaft for a slopingly traveling elevator, showing a signal transmitting equipment used for a prior art elevator according to Japanese Patent Application Utility Model Laid-Open No. 58-127066 (1983).

Referring to FIG. 1, a slopingly installed shaft 1 contains a cage 2 connected to a counter weight 3 by means of a main rope 4 and a traction machine 5 installed in a machine room 6 drives said main rope 4. A rail 7 fixed to a ceiling part of shaft 1 is laid lengthwise along said shaft 1 and guides cable hangers 8A through 8D which move along the rail 7. A moving cable 9 which suspends inside said shaft 1 is jointed to said cage 2 at one end and is supported successively by cable hangers 8A through 8D along the way. Said moving cable 9 connects electrically between devices inside said cage 2 and external controls (not illustrated) to transmit the control signal between them. A rope 10 joint to said cable hanger 8A at one end is jointed to said counter weight 3 at the other end thereof after passing through pulleys 11 and 12.

As mentioned above, a signal transmitting equipment used for a prior art elevator has a connected cable through which a control signal is to be transmitted. In the abovementioned configuration, starting a traction machine 5 causes a cage 2 and a counter weight 3 to go up and down alternately inside a shaft 1. As the cage 2 ascends, the counter weight 3 descends causing the rope 10 to pull up the cable hanger 8A. Thus, the cable hanger 8A moves upward as the cage 2 ascends causing the cable hanger 8B through 8D to move upward successively by means of the moving cable 9. When the cage 2 descends, a motion occurs in the reverse direction to the above and the moving cable 9 folds among the cable hangers 8A through 8D.

Consequently, a prior art slopingly traveling elevator has to reserve a large space at the bottom of shaft 1 to store folded moving cable 9 and, thus, a quite long shaft may become infeasible.

In an outdoor elevator, furthermore, swing due to wind may forbid the use of the suspended cable g When using a moving cable 9 is difficult an alternative signal transmitting means in place of a moving cable 9 has been provided as, for example, disclosed in Japanese Patent Application Laid-Open No. 51-17788 (1976), wherein a control signal from a machine room 6 is transmitted to a cage 2 by means of a leakage coaxial cable system or an inductive radio system. In this connection, such a system employs a weak a radio which can be freely used according to radio laws due to the low intensity of the signal.

Since said leakage coaxial cable system or inductive radio system employs a weak radio wave for an elevator control signal transmitting equipment, it is necessary to magnetically shield the shaft 1, resulting in an increase in the cost. Even though magnetic shielding may be used, if a passenger uses a radio set or a transceiver inside the cage 2, radio interference may occur. Normally, a worker may use a transceiver inside the shaft during installation work of the elevator and radio interference has to be avoided even in such a case.

SUMMARY OF THE INVENTION

Accordingly, it is an object of this invention to provide a low cost elevator control signal transmitting equipment, which allows the use of a weak radio wave without being affected by any interference due to radio waves from external sources.

Another object of this invention is to provide an elevator control signal transmitting equipment free from any interference caused not only by the abovementioned external sources but also by the radio wave being transmitted.

An elevator control signal transmitting equipment according to the present invention comprises a transmitting line laid inside a shaft, a coupling device installed inside a cage with a portion thereof extending towards said transmitting line and a shielding body of a magnetic shielding material, which envelops said transmitting line and said coupling device, a path which allows an extending part of said coupling device to travel therethrough being left not enveloped.

Since a transmitting line and an end portion of said coupling device according to this invention are enveloped with a shielding body of a magnetic shielding material, any radio waves coming from an external source are not permitted to enter into said shielding body which affords a shielding effect.

Furthermore, in the present invention no interference occurs due to irregular reflections of radio waves radiated from said transmitting line installed inside said shielding body.

BRIEF DESCRIPTION OF THE DRAWINGS

FIG. 1 is a lengthwise sectional view of an inclined shaft through which an elevator slopingly travels, showing a signal transmitting equipment used in a prior art elevator;

FIG. 2 is a lengthwise sectional view of an inclined shaft for a slopingly traveling elevator equipped with a signal transmitting equipment for an elevator according to one embodiment of this invention;

In the Figs., identical characters stand for identical portions or corresponding portions.

DESCRIPTION OF THE PREFERRED EMBODIMENTS

Figure 3:
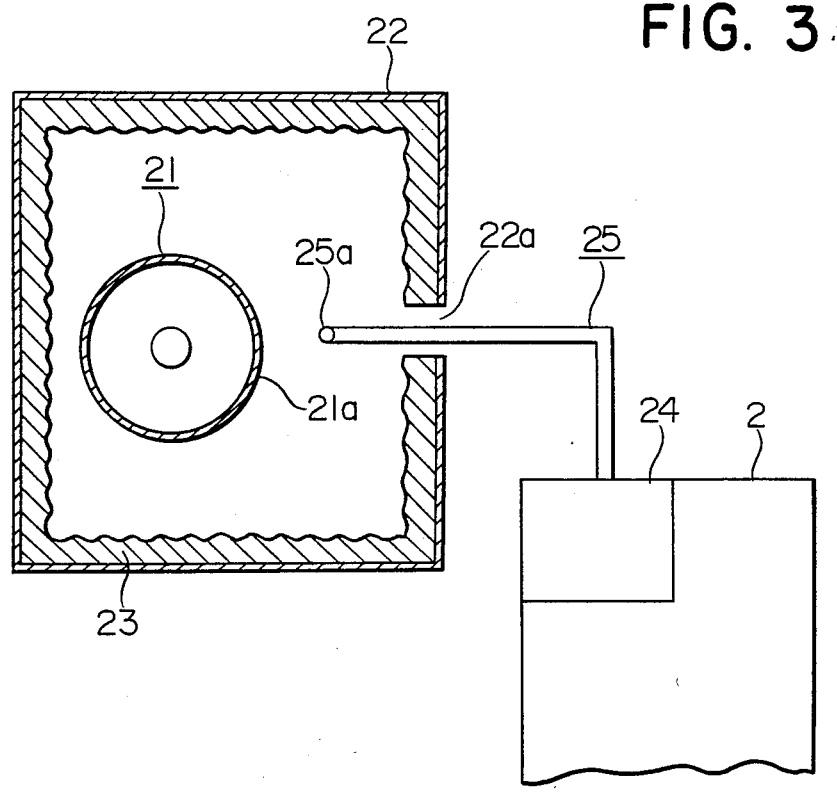
FIG. 3 is a sectional view taken along line III—III in FIG. 2.
Figure 4:
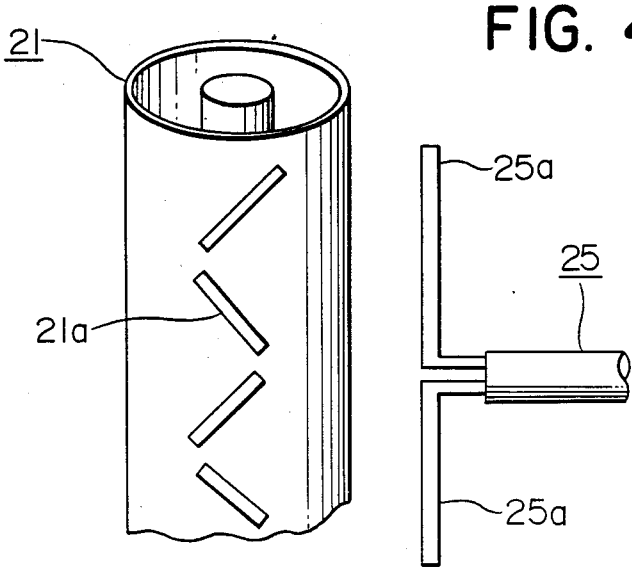
FIG. 4 is a side view of a part of a leakage coaxial cable shown in 3.

FIGS. 2 through 4 show one embodiment of this invention and parts 1 through 6 are identical parts to those used in a prior art equipment as shown in FIG. 1. Referring to the drawings, a leakage coaxial cable 21 is laid lengthwise along an inclined shaft 1 through which an elevator travels up and down. The cable 21 comprises a superficial covering which has slender open penetrating slits 21a at adequate intervals. A magnetic shielding body 22 of a magnetic shielding material like iron sheet, etc., envelops the leakage coaxial cable 21 and has a gap 22a along the side facing the cage 2. The radio wave absorbing material 23 is to the attached inner walls of the body 22. A transceiver 24 installed inside a cage 2 is connected to an antenna device 25 which forms a dipole antenna 25a along the gap 22a into the shielding body 22. A transceiver 26 installed inside a machine room 6 is connected to the leakage coaxial cable 21 with another coaxial cable 27.

The dipole antenna 25a of the antenna device 25, as a component of an elevator control signal transmitting equipment of the abovementioned configuration, travels in a facing relationship to the leakage coaxial cable 21 a long the inside of the shielding body 22 at a fixed distance between the dipole antenna 25a and the leakage coaxial cable 21 as the cage 2 travels up and down. The leakage coaxial cable 21 and the dipole antenna 25a are coupled by means of a weak radio wave of 200 to 800 MHz through the penetrating slits 21a formed in the covering of the leakage coaxial cable 21, thereby permitting the transmission and reception of different elevator control signals for controlling the operation of cage 2. In this connection, the electric power required for the cage 2 and the transceiver 24 installed inside the cage 2 is supplied by a battery (not illustrated) installed inside the case 2 or by a trolley line (not illustrated) laid along the shaft 1 and a collector (not illustrated) placed inside the cage 2.

Therefore, since the leakage coaxial cable 21 and the dipole antenna 25a are enveloped with the shielding body 22 as abovementioned, no radio waves from an external source can enter into the shielding body 22, whereby communication between them is free from any interference. Further, since the radio wave radiated from the leakage coaxial cable 21 is absorbed by the radio wave absorbing material 23 covering the whole interior surface of the shielding body 22, no irregular reflection inside the body 22 occur resulting in interference due to such irregular reflections.

Figure 5:
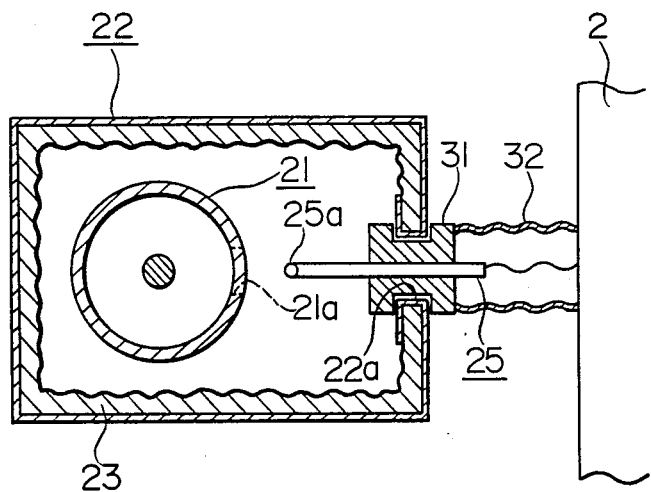
FIG. 5 is a sectional view taken along line III—III in FIG. 2 showing another embodiment according to this invention.
Figure 6:
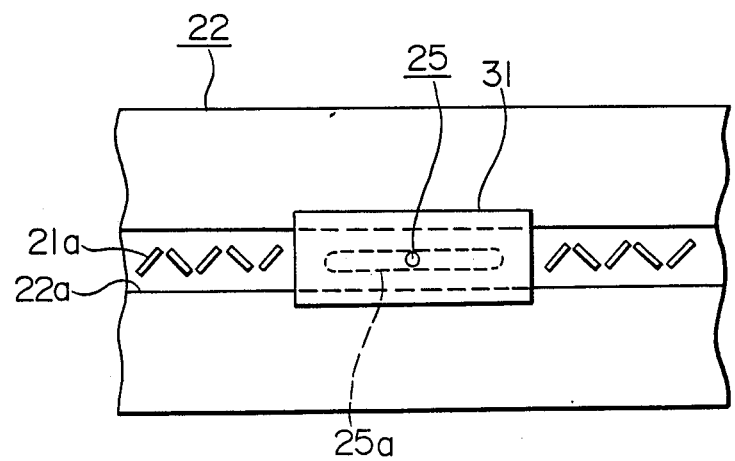
FIG. 6 is a right side elevation of a shielding body shown in FIG. 5.

Another embodiment of this invention shown in FIG. 5 and FIG. 6 comprises a slider 31 engaged slidably with the shielding body 22 by means of a gap 22a made through and lengthwise along the shielding body 22. An antenna device 25 penetrates the slider 31 and is jointed to the cage 2 by means of a flexible support 32. This embodiment functions in the same way as the above described embodiment with the additional merit that the spacing between the leakage coaxial cable 21 and the dipole antenna 25a is always kept constant regardless of the rolling motion of the cage 2, since the dipole antenna 25a is fixed to the slider 31.

Furthermore, an inductive radio may be employed in place of using the leakage coaxial cable 21 as a transmitting line in the above embodiment. In this case, employing a radio frequency several times 100 Hz may be feasible.

As mentioned above, a transmitting line and an extended portion of a coupling device are enveloped with a shielding body of a magnetic shielding material and a path through which a part of the coupling device not enveloped travels in accordance with this invention, the construction cost may be lower and a weak radio wave may be used and still be free from any interference due to radio waves from external sources.

Furthermore, in this invention, by attaching the radio wave absorbing material over the whole interior surface of the shielding body makes the equipment free from any interference due to irregular reflections of radio waves radiated from the transmitting line inside the shielding body.

What I claim is:

1. An elevator control signal transmitting equipment characterized in that a shielding body of a magnetic shielding material envelops a transmitting line laid along a shaft through which a cage travels and a portion of a coupling device extending toward said transmitting line, the transmission and reception of signals being realized through the magnetic coupling between said transmitting line and said coupling device to control the operation of said cage, a path through which a part of said coupling device travels being left not enveloped.

2. An elevator control signal transmitting equipment characterized in that the shielding body of the magnetic shielding material, whose interior surface is covered with the radio wave absorbing material stuck thereto, envelops a transmitting line laid along a shaft through which a cage travels and a portion of a coupling device extending toward said transmitting line, the transmission and reception of signals being realized through the magnetic coupling between said transmitting line and said coupling device to control the operation of said cage, a path through which a part of said coupling device travels being left not enveloped.

3. An elevator control signal transmitting equipment comprising a cage traveling through a shaft and containing an installed transceiver; a transmitting line laid lengthwise along said shaft; an antenna device connected to said transceiver installed in said cage and positioned toward said transmitting line for permitting the transmission and reception of signals to and from said transmitting line; a shielding body for magnetic shielding placed along said shaft, enveloping said transmitting line and an end portion of said antenna device, said body having a gap formed therein for providing a path for said antenna device, said antenna device following the ascending or descending movement of said cage.

4. An elevator control signal transmitting equipment according to claim 3, characterized in that said transmitting line is a leakage coaxial cable.

5. An elevator control signal transmitting equipment according to claim 4, characterized in that slender penetrating slits are formed through a superficial covering of said leakage coaxial cable at regular intervals.

6. An elevator control signal transmitting equipment according to claim 4, characterized in that said antenna device is equipped with a dipole antenna positioned inside said shielding body along said leakage coaxial cable.

7. An elevator control signal transmitting equipment according to claim 6, characterized in that said leakage coaxial cable is connected to a transceiver installed inside a machine room, the transmission and reception of signal through the radio wave coupling between said leakage coaxial cable and said antenna device permitting to control the operation of said cage.

8. An elevator control signal transmitting equipment according to claim 6, characterized in that the interior surface of said shielding body is covered with the radio wave absorbing material.

9. An elevator control signal transmitting equipment according to claim 8, characterized in that said shielding body is made of an iron sheet.

10. An elevator control signal transmitting equipment according to claim 7, characterized in that said leakage coaxial cable and said antenna device are coupled by means of a 200 to 800 MHz weak radio wave through said penetrating slits of said cable.

11. An elevator control signal transmitting equipment according to claim 7, characterized in that a sliding device is installed in an engaging relationship with said gap to move slidingly through said gap.

12. An elevator control signal transmitting equipment according to claim 11, characterized in that said sliding device is fixed to said cage through a resilient support.

13. An elevator control signal transmitting equipment according to claim 3, characterized in that an inductive radio is used for said transmitting line.

14. An elevator control signal transmitting equipment according to claim 13, characterized in that said inductive radio employs a frequency of several times 100 KHz.

* * * * *